United States Patent [19]

Matsui

[11] 4,286,538

[45] Sep. 1, 1981

[54] MULTIPURPOSE FLOATING STRUCTURE

[76] Inventor: Atsushi Matsui, 12, Baban-cho, Shizuoki-shi, Shizuoka-ken, Japan

[21] Appl. No.: 7,914

[22] Filed: Jan. 30, 1979

[30] Foreign Application Priority Data

Feb. 1, 1978 [JP] Japan .................................. 53-11010

[51] Int. Cl.³ .............................................. B63B 35/00
[52] U.S. Cl. .................................... 114/266; 114/267; 114/77 R; 114/263; 9/8 P; 9/25; 9/8 R; 405/219; 405/195; 290/43; 440/8
[58] Field of Search ..................... 290/43, 54; 405/195, 405/219; 9/8 R, 8 P, 25; 14/27; 114/264, 265, 266, 267, 258, 261, 263, 77 R, 77 A

[56] References Cited

U.S. PATENT DOCUMENTS

| 1,149,092 | 4/1979 | Cros | 290/43 |
|---|---|---|---|
| 1,879,745 | 9/1932 | Henker | 114/265 |
| 2,488,542 | 11/1949 | Houghtaling | 114/264 |
| 2,565,369 | 8/1951 | Hamilton | 114/266 |
| 3,118,408 | 1/1964 | Knapp | 114/265 |
| 3,592,155 | 7/1971 | Rosenberg | 114/265 |
| 3,691,974 | 9/1972 | Seiford | 114/266 |
| 3,791,080 | 2/1974 | Sjoberg | 114/266 |
| 3,951,086 | 4/1976 | Lown | 114/265 |

Primary Examiner—Trygve M. Blix
Assistant Examiner—D. W. Keen
Attorney, Agent, or Firm—Haseltine & Lake

[57] ABSTRACT

A multipurpose floating structure comprises a large number of flotation units joined together in a regular reticulated pattern in one or more horizontal tiers, each flotation unit comprising: a square plate; a watertight can structure of inverted conical shape fixed at its base to the lower surface of the square plate; a vertical leg column fixed at its upper end to the vertex part of the can structure; a concrete weight disposed around and supported on the leg column; and connecting fittings for connecting the corners of the square plates of four adjacent flotation units at their common meeting point.

5 Claims, 10 Drawing Figures

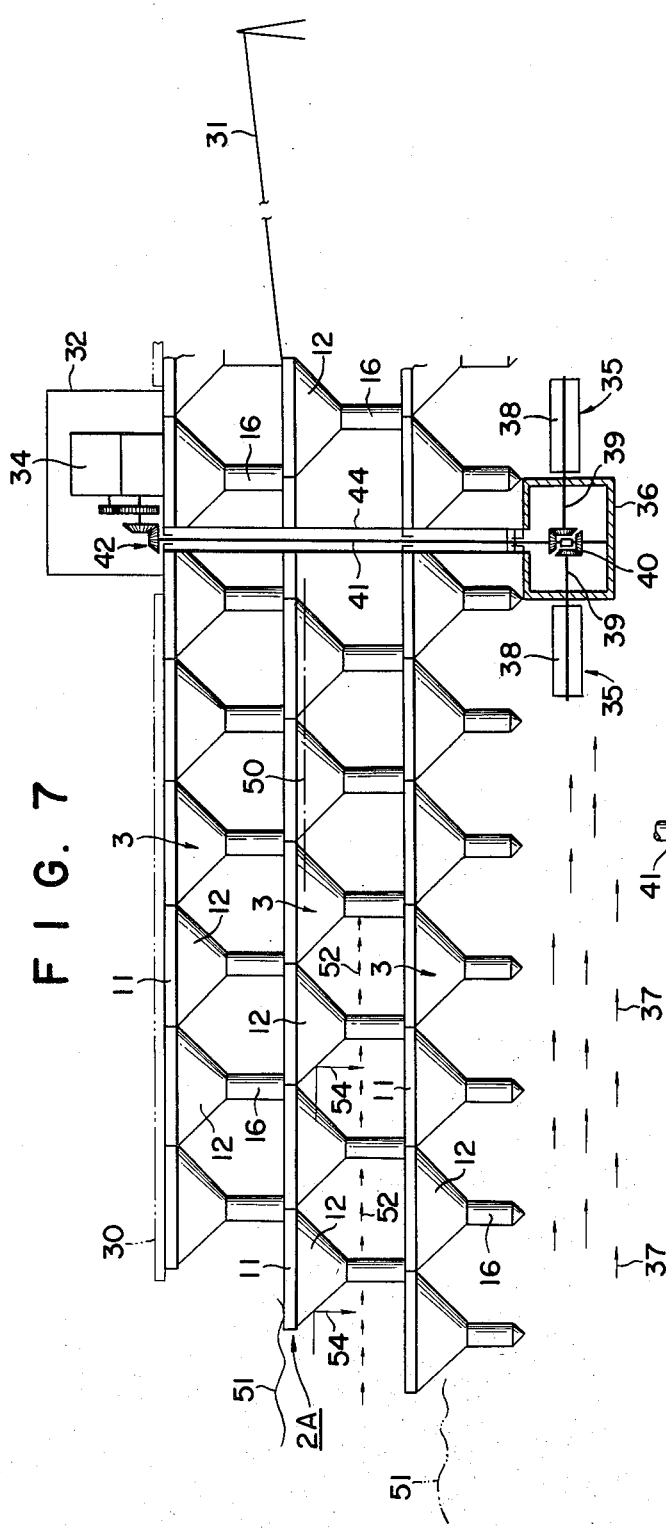
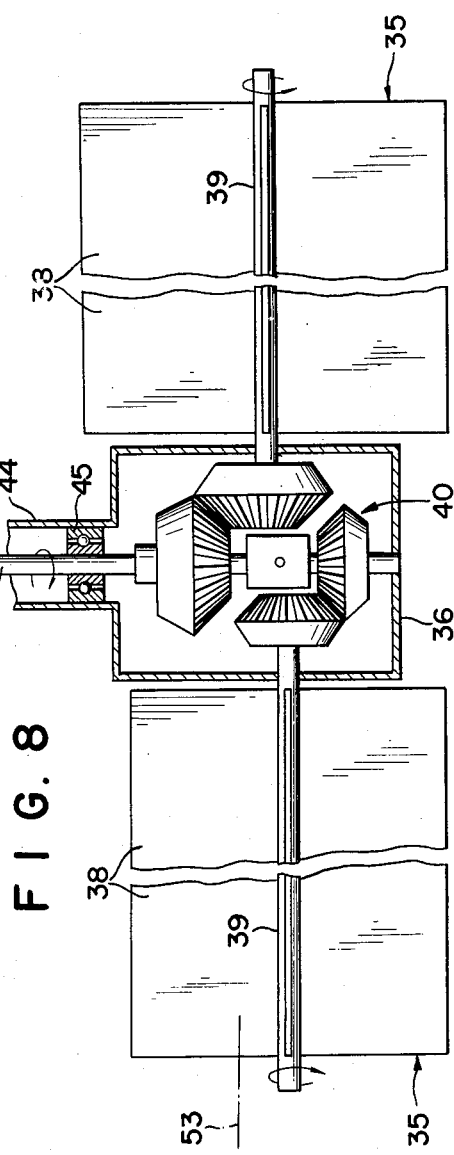

MULTIPURPOSE FLOATING STRUCTURE

BACKGROUND OF THE INVENTION

This invention relates generally to floating structures of stationary or moored type and more particularly to a multipurpose floating structure made up of a large number of flotation units joined together in a regular pattern in at least one horizontal tier. A floating structure of this character can be used in a wide variety of applications and has several useful features as described hereinafter.

One important application of this invention is the provision of a floating airport. A floating airport can solve a number of problems encountered in constructing and operating an airport on land. Some of these problems are: the need for using a tremendous land area with attendant sacrifices and high cost of purchasing the land; compensation for noise pollution; and distance between the airport and the nearest metropolitan area.

Throughout this earth, there are countless bodies of flowing water, which constitute a limitless source of power. Yet, except for a few water wheels of ancient type, there have been few attempts to utilize this source of power.

SUMMARY OF THE INVENTION

It is an object of this invention to provide a multipurpose floating structure of prefabricated type which can be used for a wide variety of applications.

Another object of this invention is to provide a multipurpose floating structure adapted for use as a floating airport.

Still another object of the invention is to provide a multipurpose floating structure adapted for use as a floating electric power generating plant.

According to this invention in one aspect thereof, briefly summarized, there is provided a multipurpose floating structure comprising a plurality of flotation units joined together in a coherent, tesselated or reticulated pattern, as viewed in plan view, in at least one horizontal tier, each flotation unit comprising: a flat plate of a geometrical shape in plan view such as to fit snugly with the flat plates of adjacent flotation units to form said pattern; a watertight can structure of inverted conical shape, of a vertex angle of the order of 90 degrees, fixed at the base thereof in a watertight manner to the lower surface of the flat plate; a vertical leg column fixed at the upper end thereof to the lower vertex part of the can structure and having connection means at the lower end thereof; a weight disposed around and supported on the leg column; and connecting means for connecting the flotation unit to adjacent flotation units to form said pattern.

According to this invention in another aspect thereof, briefly summarized, there is provided a multipurpose floating structure as described above which has at least two tiers of the flotation units and is used as an electric power generating plant anchored in a body of flowing water, and which further comprises at least one water wheel adapted to be driven by the moving water and rotatably supported at and by the lower part of the floating structure, at least one electric generator mounted on the upper parted of the floating structure, and means for transmitting mechanical power from the water wheel to the electric generator thereby to cause the same to generate electric power.

The nature, utility, and further features of this invention will be more clearly apparent from the following detailed description when read in conjunction with the accompanying drawings which are briefly described below, and in which like parts are designated by like reference numerals.

BRIEF DESCRIPTION OF THE DRAWINGS

In the drawings:

FIG. 7 is an elevation showing an example of a floating structure adapted to function as an electric power generating plant according to the invention;

FIG. 8 is a relatively enlarged elevation showing a water wheel and a gear mechanism of the plant shown in FIG. 7;

DETAILED DESCRIPTION

Figure 1:
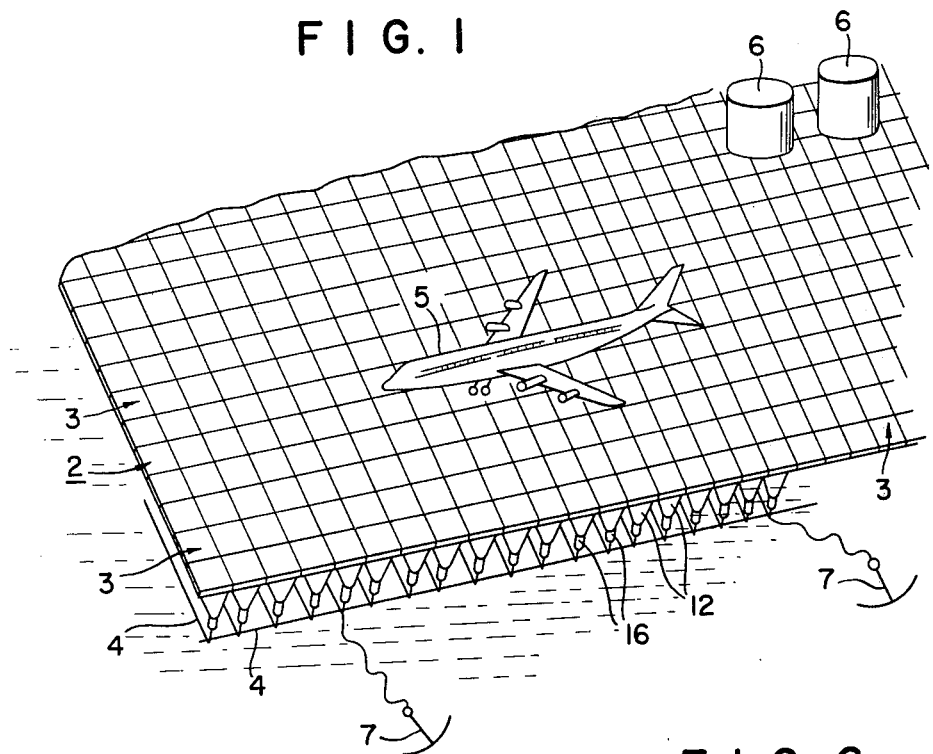
FIG. 1 is a partial perspective view showing an example of a multipurpose floating structure adapted for use as a floating airport according to this invention.

Referring first to FIG. 1, the multipurpose floating structure 2 of this invention comprises a plurality of flotation units 3 connected integrally together as described hereinafter and partly joined together by tie rods 4. Almost any number of the flotation units 3 can be thus joined to assemble a floating structure for the intended purpose. For example, a floating airport can be constructed from these flotation units 3 for aircraft 5 and can be made sufficiently large to support even fuel storage tanks 6. While only one tier of the flotation units 3 are shown in the floating structure 2 in FIG. 1, a plurality of tiers of these flotation units 3 stacked one above the other can be used as described hereinafter. The floating structure 2 can be assembled at a convenient place and towed to the site of its use or it can be assembled at that site. It is moored in place by anchoring devices 7 such as anchors with anchor chains.

Each flotation unit 3 comprises essentially a square steel plate (or platform) 11 measuring from 2 to 3 meters (m.) on one side, a can flotation structure 12 of inverted conical shape made of steel plate or reinforced plastic and tightly secured at its base to the lower surface of the square steel plate 11, a steel leg column 14 secured at its upper end to the bottom 13, or vertex part, of the can structure 12 and having a connection eye fitting 15 at its lower end, and a weight 16 made of some inexpensive material such as concrete and fitted around the column 14.

Figure 6:
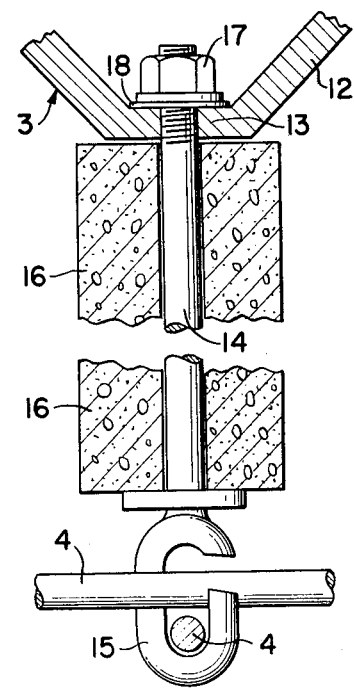
FIG. 6 is an elevation, with parts cut away and foreshortened and parts shown in vertical section, showing a leg column secured at its upper end to a can structure, and a concrete weight of a flotation unit and tie rods.
Figure 2:
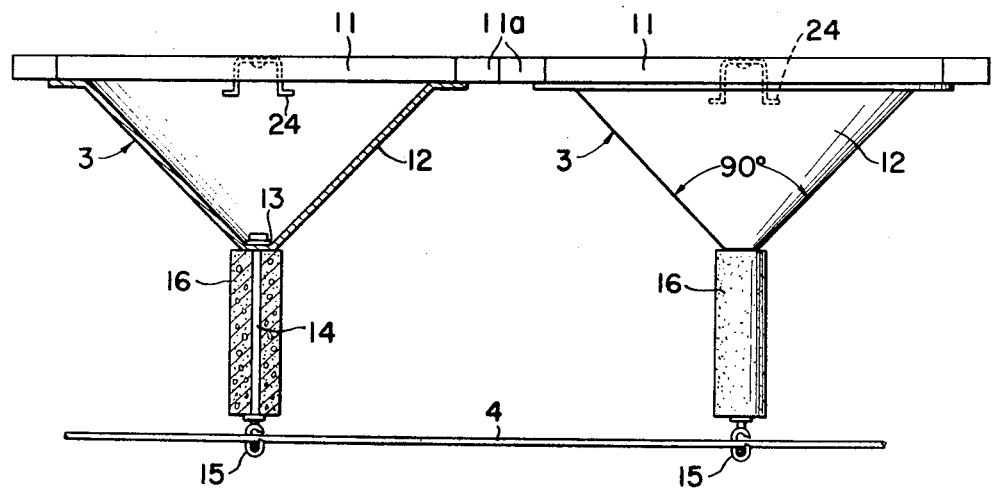
FIG. 2 is a relatively enlarged elevation showing the construction of flotation units which are assembled to form the floating structure of the invention.

In the illustrated embodiment of the invention, the vertex angle of the conical can structure 12 is optimally of the order of 90 degrees, that is, each geometrical element of the conical surface of the structure 12 is at an angle of 45 degrees with the cone centerline, and the upper end of the leg column 14 is threaded as shown in FIG. 6 and, after it has been passed through a hole in the bottom 13 of the can structure 12, is secured by a nut 17 screwed thereonto over a sealing packing 18 fitted around the leg column 14 and interposed between the nut 17 and the bottom 13.

Figure 4:
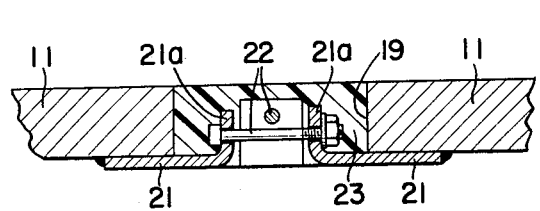
FIG. 4 is a further enlarged, fragmentary elevation, in vertical section, showing the manner in which two diagonally opposite square plates are connected at their common corner meeting point.
Figure 3:
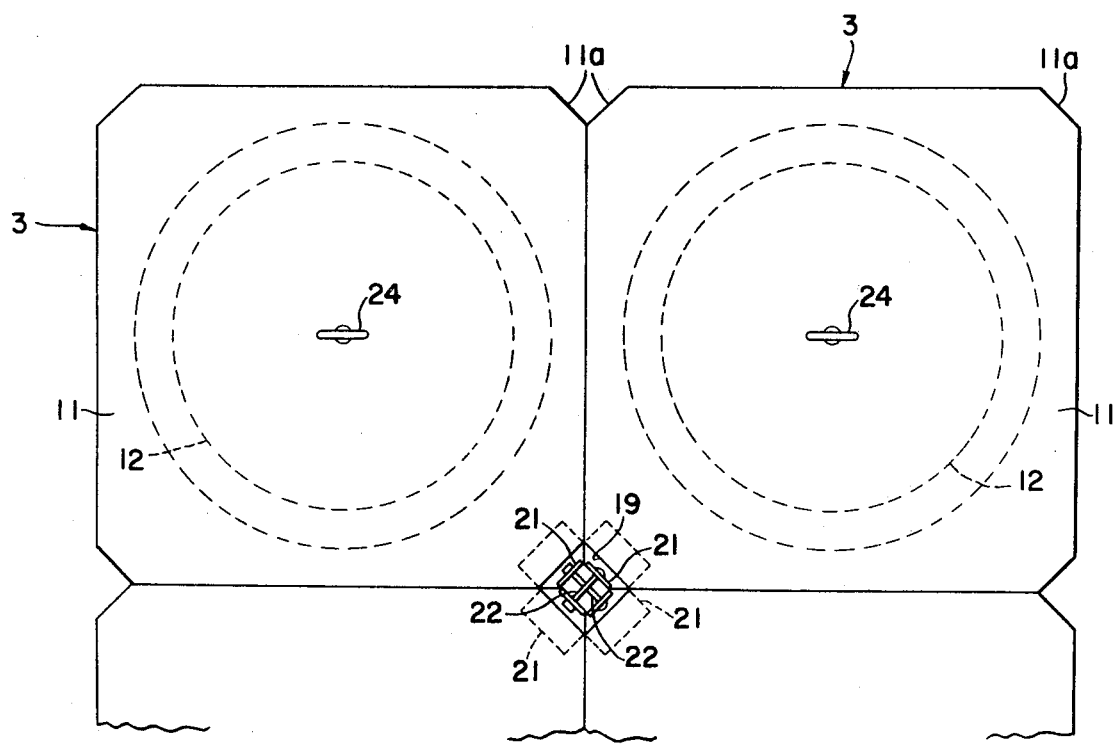
FIG. 3 is a plan view, with a part cut away, showing the manner in which the square plates of four adjacent flotation units are joined at their common corner meeting point.
Figure 9:
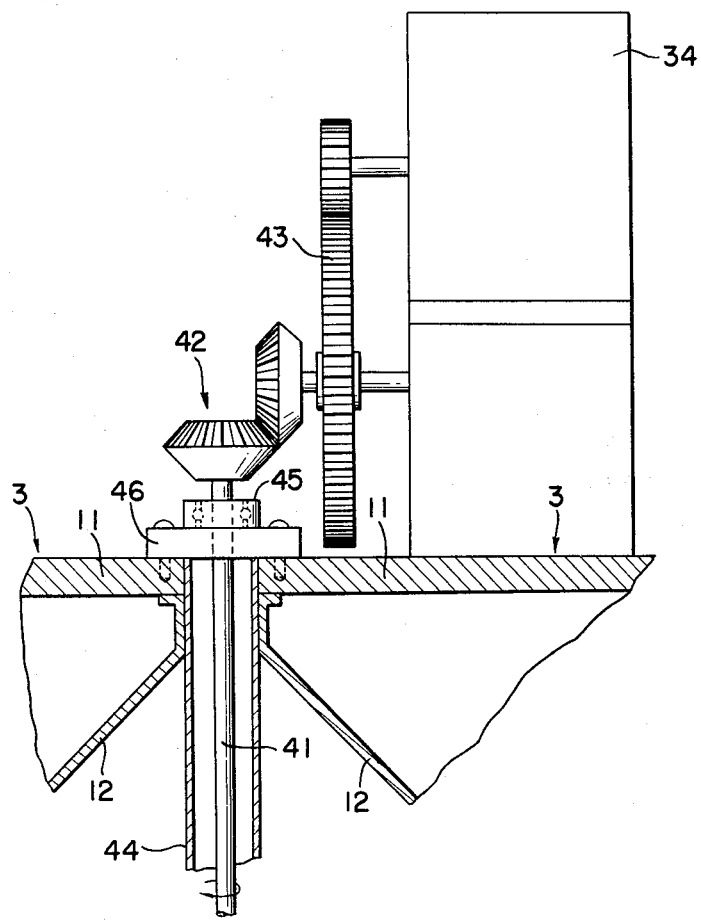
FIG. 9 is an elevation, with some parts cut away, showing an electric generator and mechanisms for transmitting thereto rotational power from the water wheel of the same plant.

The four corners of each square plate 11 are beveled off as at 11a so that, when a number of flotation units 3 are assembled to form the floating structure 2, a square hole 19 will be formed at each juncture of four square plates 11 as shown in FIG. 3. An angle-shaped connecting bracket 21 is fixed at one end thereof by welding to the lower surface of each square plate 11 at each of its beveled corners as shown in FIG. 4 so that its free upwardly bent end 21a will be disposed within the square hole 19 and be parallelly opposed to the corresponding bent end 21a of the connecting bracket 21 of the diagonally opposite square plate 11 in assembled state. Thus, as shown in FIG. 3, in each hole 19 at the juncture of four square plates 11, there are two pairs of parallelly opposed bent ends 21a of brackets 21 of diagonally opposite square plates 11. Each pair of opposed bent ends 21a of the brackets 21 is joined by bolts and nuts 22. After assembly of the flotation units 3 and tightening of the bolts and nuts 22, each hole 19 is filled with a reinforced plastic filling material 23.

Two perpendicularly crossing tie rods 4 are passed through each of the above mentioned connection eye fitting 15. For convenience in handling the flotation units 3 during their fabrication, transportation and assembly at the construction site, each flotation unit 3 is provided at the center of its square plate 11 with a retractable suspension member 24 with which the hoisting hook 25 of a crane can be engaged to lift and carry the flotation unit 3.

It has been found that the inverted conical shape of each can structure 12, particularly with a vertex angle of 90 degrees, is highly advantageous not only in its flotation characteristic but also in its individual and independent wave-damping action which is exhibited irrespective of the direction from which waves collide with the can structure 12. Even more pronounced is the cooperative action of a large number of assembled flotation units 3 in unison to calm rough waters. Moreover, the can structures 12 function cooperatively with the weights 16 in a manner whereby rolling and pitching of the entire floating structure 2 is suppressed. Accordingly, this floating structure 2 can be advantageously utilized for various purposes even under adverse wind and wave conditions.

Figure 5:
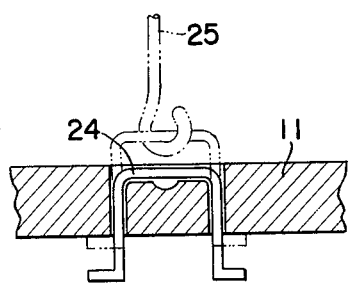
FIG. 5 is a fragmentary elevation, partly in vertical section, showing a retractable suspension member for engagement by a crane hook for lifting a flotation unit.

Another advantageous feature of this structure is that, since the floating structure 2 is made up of a plurality of independent flotation units 3, if any of these units 3 should be damaged or become defective, this unit only can be readily repaired or replaced. More specifically, a damaged or defective flotation unit 3 is removed from the floating structure by disconnecting the tie rods 4 from the eye fitting 15 of that flotation unit 3, removing the filling material 23 from the holes 19 at the four corners of the steel plate 11 of that unit, removing the bolts and nuts 22 connecting that steel plate 11 to the other steel plates 11 at the four corners, engaging the suspension member 24 with a crane hook 25 as indicated by chain line in FIG. 5, and lifting the flotation unit for repair or replacement. A repaired or new flotation unit 3 is lowered by a crane into the space thus made vacant in the floating structure 2 and is connected to the adjacent flotation units 3 as described hereinbefore.

The multipurpose floating structure 2 as described above is adapted for a variety of applications, as described below, other than that for a floating airport as mentioned hereinbefore. For example, the floating structure can be used solely for supporting tanks for storing oil and other liquids. In this case a stack of two or more tiers of the flotation units 3 are used for added flotation. Such a structure is also highly effective in damping waves and affording greater stability of the entire floating structure.

In another application of the floating structure 2, it can be used to support living quarters such as residence houses and anchored at a place conveniently near the center of a metropolitan area.

The floating structure of this invention can be used as a floating jetty or pier for utilization by relatively large ships at places such as inlets, bays, estuaries, rivers, and lakes where wharves are unavailable or where the shore is far from navigable waters. It will be obvious that all of these applications of the floating structure of this invention can be practiced for commercial, recreational, military, and other purposes.

The floating structure will now be described with respect to an important application thereof, wherein it is combined with a hydraulic electric power generating plant and anchored in waters with currents.

Figure 10:
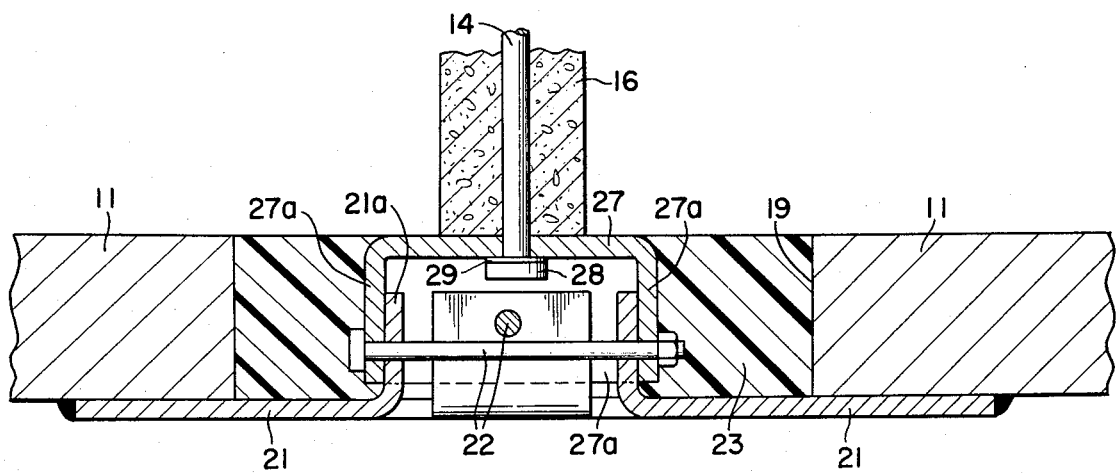
FIG. 10 is an enlarged fragmentary elevation, in vertical section, showing the manner in which a floatation unit of an upper tier is secured to the immediately lower tier of floatation units.

In one example of this application as illustrated in FIGS. 7, 8, 9 and 10, a large number of flotation units 3, each having a conical can structure 12 and a weight 16, are assembled as described hereinbefore to form an integral floating structure 2A of two or more tiers (three tiers in the instant example) of these flotation units 3. Each flotation unit 3 of the upper two tiers may be secured to the immediately lower tier of the floatation units as shown in FIG. 10. A cap member 27 having four side walls 27a is fitted on and outside the four upwardly bent ends 21a of the brackets 21 described in connection with FIG. 4, and the side walls 27a and the bent ends 21a snugly fitted in the cap member 27 are secured together by means of bolts and nuts 22 passed therethrough. The leg column 14 of a floatation unit of the immediately upper tier is formed with a head 28 which abuts the inner surface of the cap member 27 through a packing 29. The square plates 11 of the floatation units 3 of the uppermost tier may be used as they are to form a floor or platform surface or they may be covered with a covering such as floor plates 30 as in this example. The floating structure 2A is moored with mooring lines 31 in a body of flowing water.

This floating structure 2A is provided at a dry part thereof with at least one electric generation apparatus 32 including an electric generator 34. This generator is driven by a water-flow-driven turbine or water wheel 35 rotatably supported by a gear box 36 at position below the lowest tier of the flotation units 3 where the velocity of the water current 37 is high. The water wheel 35 comprises vanes 38 mounted on respective horizontal shafts 39, which are supported by the gear box 36 end connected at their inner ends to a lower bevel gear mechanism 40. The lower bevel gear mechanism 40 is connected by way of a vertical shaft 41 extending upward to an upper bevel gear mechanism 42, which is coupled via of speed-change mechanism 43 to the shaft of the electric generator 34.

The vertical shaft 41 is housed within a shaft casing 44 and is rotatably supported by bearings 45 fixed to the shaft casing 44 at the upper and lower ends thereof. This shaft casing 44 is secured at its upper end by way of an adjusting mechanism 46 to steel plates 11 of the uppermost tier of the flotation units 3 and is fixedly connected at its lower end integrally to the gear box 36. The orientation of the water wheel 35 relative to the direction of the water current 37 is adjusted by turning the adjusting mechanism 46 around a vertical axis. With respect to this floating mechanism in a floating state, the water level of the body of water is, for example, as indicated at 50 in FIG. 7, there being waves 51. The water is freely flowing as at 37. At an intermediate level, the water flow is slowed by the parts of the floating structure 2A, whereby the water is flowing gently as at 52.

When the gear box 36 is so submerged in the water that the position of the horizontal shafts 39 of the water wheel 35 coincides substantially with the boundary 53 (FIG. 8) between the waves 51 and the current 37, the vanes 38 rotated by the current 37 reach the gentle water flow 52 of the waves 51 and avoid the resistance of the current 37. Therefore, rotational energy is efficiently transmitted.

Irrespective of the direction from which the waves collide with the floating structure 2A, the waves are deflected in the direction 54 by the conical cans 12, and the water, avoiding becoming turbulent, assumes a gentle flow. Accordingly, even if there is continually some variation, a substantially constant water level 50 is maintained, and the degree of stability is increased, whereby the power generation apparatus 32 installed on the floating structure 2A is not affected by the waves to undergo rocking. Therefore, rotation power is transmitted from the water wheel 35 through the lower bevel gear mechanism 40, the vertical shaft 41, the upper bevel gear mechanism 42, and the speed change mechanism 43 to drive the generator 34. Thus, an almost unlimited generation of electric power is accomplished.

Since the source of power in this application of the invention is flowing water, this power source can be said to be almost limitless. Moreover, the utilization of this power source to generate electric power entails no pollution of the environment, whatsoever. It will be obvious that, while only one water wheel 35, the corresponding generator 34, and related mechanism have been described above and are shown in FIGS. 7, 8, and 9, a large number of water wheels and corresponding generators can be installed on a single floating structure 2A to generate electric power of large magnitude.

In almost all of the applications of the floating structure of this invention, the structure can serve as a shelter for small fish. This technique is one of the important and promising methods in fish culture, which is being intensely studied in recent years.

What I claim is:

1. A multipurpose floating structure comprising a plurality of flotation units joined together in a coherent, tesselated or reticulated pattern, as viewed in plan view, in at least one horizontal tier, each flotation unit comprising: a flat plate of a geometrical shape in plan view such as to fit snugly with the flat plates of adjacent flotation units to form said pattern; a watertight can structure of inverted conical shape, of a vertex angle of the order of 90 degrees, fixed at the base thereof in a watertight manner to the lower surface of the flat plate; a vertical leg column fixed at the upper end thereof to the lower vertex part of the can structure and having connection means at the lower end thereof; a weight disposed around and supported on the leg column; and connecting means for connecting the flotation unit to adjacent flotation units to form said pattern.

2. A multipurpose floating structure according to claim 1 in which the flat plates are in the geometrical shape of identical squares disposed edge-to-edge in a network pattern wherein corners of four adjacent squares meet at one meeting point, and the connecting means comprises connecting four brackets respectively fixed to the four corners of each square flat plate, the four brackets respectively of the four adjacent flat plates at each meeting point being mutually connected by bolts and nuts.

3. A multipurpose floating structure according to claim 2, including tie rods disposed in network pattern in plan view and connected to the connection means at the lower ends of the leg columns of the flotation units.

4. A multipurpose floating structure according to claim 1, including at least two tiers of floatation units stacked one above the other, and means for securing the lower end of the leg column of each floatation unit to the immediately lower tier of the floatation units.

5. A multipurpose floating structure according to claim 4, further comprising at least one water wheel adapted to be driven by the moving water and rotatably supported at and by the lower part of the floating structure, at least one electric generator mounted on the upper part of the floating structure, and means for transmitting mechanical power from the water wheel to the electric generator thereby to cause the same to generate electric power.

* * * * *